US006801944B2

(12) United States Patent
Motoyama et al.

(10) Patent No.: US 6,801,944 B2
(45) Date of Patent: Oct. 5, 2004

(54) USER DEPENDENT CONTROL OF THE TRANSMISSION OF IMAGE AND SOUND DATA IN A CLIENT-SERVER SYSTEM

(75) Inventors: Satoru Motoyama, Hamamatsu (JP); Shigeo Tsunoda, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/037,219

(22) Filed: Mar. 10, 1998

(65) Prior Publication Data

US 2001/0054063 A1 Dec. 20, 2001

(30) Foreign Application Priority Data

Mar. 13, 1997 (JP) .................................. HEI 9- 59603

(51) Int. Cl.[7] ........................ G06F 15/16; G06F 15/173
(52) U.S. Cl. ..................... 709/229; 709/217; 709/226; 709/235
(58) Field of Search ........................... 709/200, 219, 709/203, 216, 241, 232, 233, 234, 235, 217, 226, 229; 714/6; 707/501.1; 370/229–240

(56) References Cited

U.S. PATENT DOCUMENTS

| 5,257,259 | A |   | 10/1993 | Tsurumi |
| 5,325,423 | A |   | 6/1994 | Lewis |
| 5,335,073 | A |   | 8/1994 | Yamamoto |
| 5,513,314 | A | * | 4/1996 | Kandasamy et al. ........... 714/6 |
| 5,535,224 | A |   | 7/1996 | Kondo et al. |
| 5,544,228 | A |   | 8/1996 | Wagner et al. |
| 5,574,949 | A |   | 11/1996 | Tsurumi |
| 5,768,350 | A |   | 6/1998 | Venkatakrishnan |
| 5,799,254 | A | * | 8/1998 | Karmi et al. ................ 455/528 |
| 5,810,603 | A |   | 9/1998 | Kato et al. |
| 5,883,957 | A |   | 3/1999 | Moline et al. |
| 5,892,769 | A | * | 4/1999 | Lee ............................. 370/447 |
| 5,896,498 | A | * | 4/1999 | Dent et al. ................... 713/201 |
| 5,899,699 | A |   | 5/1999 | Kamiya |
| 5,915,238 | A | * | 6/1999 | Tjaden ........................ 704/260 |

(List continued on next page.)

FOREIGN PATENT DOCUMENTS

| DE | 43 26 789 | 2/1995 |
| EP | 0 531 670 | 7/1992 |
| JP | 4-18835 | 1/1992 |
| JP | 04-316294 | 11/1992 |
| JP | 06-044155 | 2/1994 |
| JP | 06-259362 | 9/1994 |
| JP | 06-351006 | 12/1994 |
| JP | 07-064579 | 3/1995 |
| JP | 07-123132 | 5/1995 |
| JP | 07-152668 | 6/1995 |
| JP | 07-225731 | 8/1995 |
| JP | 7-261756 | 10/1995 |
| JP | 08-044638 | 2/1996 |
| JP | 08-110777 | 4/1996 |
| JP | 09-153012 | 6/1997 |
| JP | 08-289251 | 11/1999 |

OTHER PUBLICATIONS

R. Foss et al., "Routing MIDI Messages Over Ethernet", Journal of the Audio Engineering Society, vol. 44, No. 5, May 1, 1996, pp. 406–408, 410, 412–415.
U.S. Ser. No. 08/998,209 filed Dec. 24, 1997.
U.S. Ser. No. 09/896,443 filed Jun. 29, 2001.
U.S. Ser. No. 09/897,691 filed Jun. 29, 2001.

*Primary Examiner*—Paul H Kang
(74) *Attorney, Agent, or Firm*—Morrison & Foerster LLP

(57) ABSTRACT

A server system having a main proxy server and a mirror server, wherein the main proxy server includes a unit for acknowledging an access by a user; a detecting unit for detecting the conditions of the main proxy server and the mirror server; and a judging unit for judging, from the conditions of the main proxy server or the mirror server detected by the detecting unit, whether data is to be transmitted to the user from the main proxy server or from the mirror proxy server; and a transmitting unit for transmitting data to the user.

6 Claims, 6 Drawing Sheets

U.S. PATENT DOCUMENTS

| | | | | |
|---|---|---|---|---|
| 5,930,473 A | * | 7/1999 | Teng et al. | 709/204 |
| 5,967,792 A | | 10/1999 | Matsumoto | |
| 5,978,841 A | * | 11/1999 | Berger | 709/217 |
| 5,982,816 A | | 11/1999 | Ogita et al. | |
| 5,983,280 A | | 11/1999 | Hunt | |
| 5,986,201 A | | 11/1999 | Starr et al. | |
| 5,991,809 A | * | 11/1999 | Kriegsman | 709/226 |
| 5,995,490 A | * | 11/1999 | Shaffer et al. | 370/260 |
| 6,026,368 A | * | 2/2000 | Brown et al. | 705/14 |
| 6,031,832 A | * | 2/2000 | Turina | 370/348 |
| 6,053,740 A | | 4/2000 | Nakata et al. | |
| 6,067,566 A | | 5/2000 | Moline | |
| 6,076,166 A | * | 6/2000 | Moshfeghi et al. | 713/201 |
| 6,161,142 A | * | 12/2000 | Wolfe et al. | 709/230 |
| 6,199,076 B1 | * | 3/2001 | Logan et al. | 707/501 |

* cited by examiner

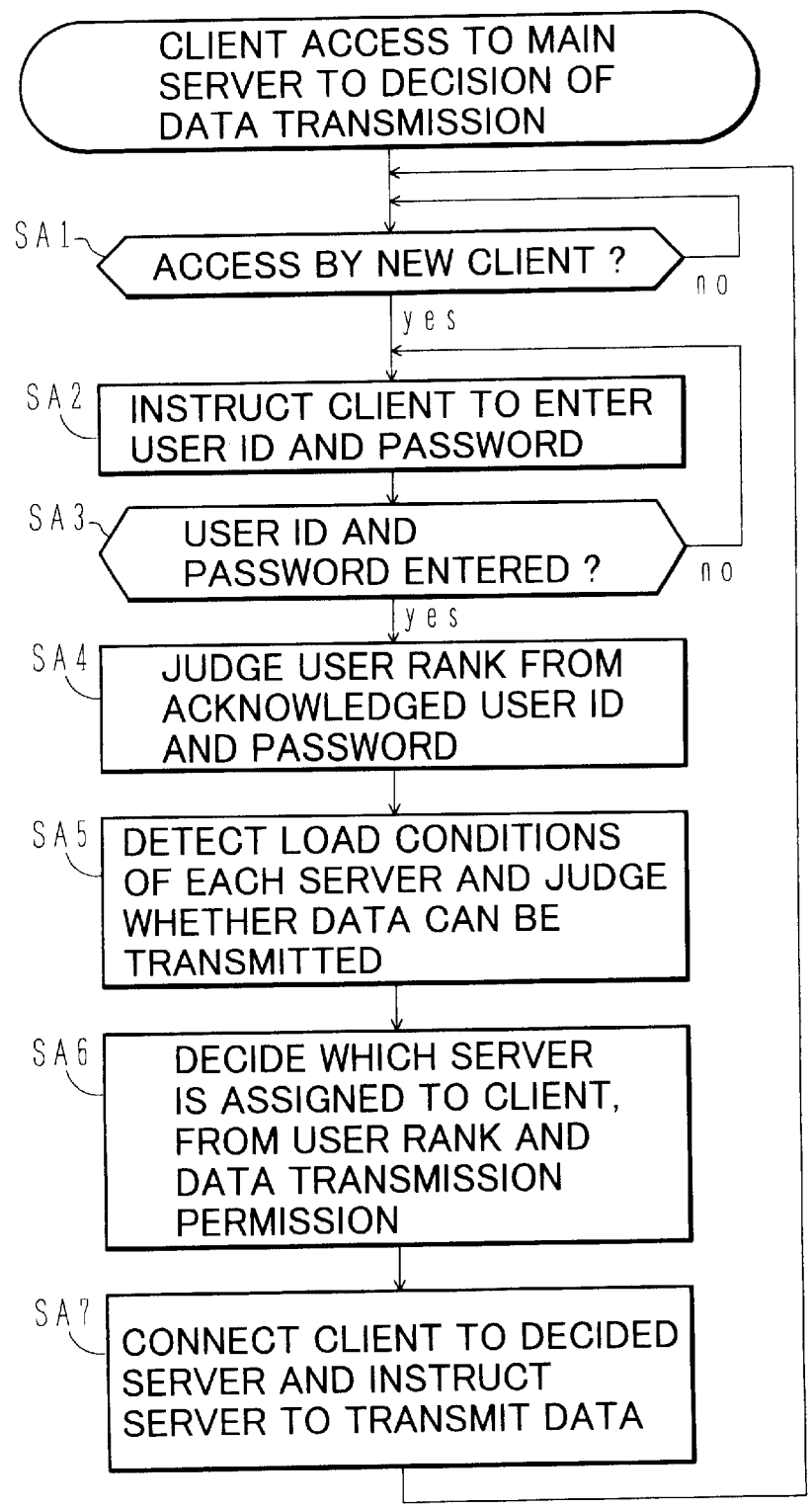

USER DEPENDENT CONTROL OF THE TRANSMISSION OF IMAGE AND SOUND DATA IN A CLIENT-SERVER SYSTEM

This application is based on Japanese patent application No. 9-59603 filed on Mar. 13, 1997, the entire contents of which are incorporated herein by reference.

BACKGROUND OF THE INVENTION a) Field of the Invention

The present invention relates to data communications technologies, and more particularly to data communications technologies capable of transmitting data to a number of users under various communications conditions.

b) Description of the Related Art

As a standard specification for communications between electronic musical instruments, a music instrumental digital interface (MIDI) specification is known. Electronic musical instruments equipped with interfaces of the MIDI specification can communicate with each other by transferring MIDI data via a MIDI cable.

For example, an electronic musical instrument transmits MIDI data of a musical performance by a player, and another musical instrument receives it to reproduce it. As one electronic musical instrument is played, another electronic musical instrument can be played in real time.

In a communications network interconnecting a plurality of general computers, various types of data are transferred. For example, live musical tone data or other MIDI data can be transmitted from one computer, which once stored the data in its storage device such as a hard disk, via the communications network to another computer which stores the received data in its storage device. A general communications network is, however, configured to perform only general data communications, and is not configured to properly process MIDI data.

Specifically, although the MIDI specification allows the real time communications to be performed between electronic musical instruments, it is not suitable for long distance communications and communications via a number of nodes. The general communications network is essentially configured to provide services of long distance communications and multiple-node communications, but it does not take account of real time communications between electronic musical instruments.

Real time communications of musical information uses a large amount of information per unit time, and the traffic of the communications line becomes heavy. As compared to point-to-point communications, point-to-multipoint communications of musical tone data is more likely to make the traffic of communications lines heavy. The heavy traffic of communications lines generates a transmission delay and hinders a real time musical performance.

In general communications networks, any user can receive the same data from a server computer by accessing it.

The performance and storage capacity of each computer of a user are not always the same. If the performance of a user computer is low and the storage capacity thereof is small, a large amount of data may not be received. Even if data can be received, data storage or data processing may become difficult.

For example, even if MIDI data only can be processed, processing both MIDI data and image data may become difficult. A user having a high performance computer often requests a large amount of data, whereas a user having a low performance computer often requests a small amount of data. Unless a user notifies a server computer of its request, the server computer transmits the same amount of data to any user and there is some inconvenience on the user side.

Each user may request a different type of data. For example, some users require both MIDI data and image data, whereas other users require only MIDI data.

A data access fee may change with the type of data. For example, an access fee for both MIDI data and image data is expensive, whereas an access fee for MIDI data only is low. There is a user need of receiving desired data within an allowable amount of money.

Real time communications, communications between a number of users, or long distance communications uses a large amount of information per unit time, and the traffic of communications lines may become heavy. Congested traffic of communications lines causes a lowered communications speed and a difficulty in real time musical performance.

Different data is often requested by each user. However, a server computer transmits the same data to each user and it is difficult for a user to receive only the desired data.

SUMMARY OF THE INVENTION

It is an object of the present invention to provide communications technologies capable of alleviating a congested traffic of communications lines.

It is another object of the present invention to provide communications technologies capable of transmitting only desired data to each user.

According to one aspect of the present invention, there is provided a server computer comprising: means for receiving a user identifier transmitted from a user; and means for transmitting data to the user by changing the contents of the data in accordance with the user identifier received by the receiving means.

Since a user can be identified from the user identifier supplied from the user, data desired by the user can be transmitted.

According to another aspect of the present invention, there is provided a server system having a main proxy server and a mirror server, wherein the main proxy server comprises: means for acknowledging an access by a user; means for detecting the conditions of the main proxy server and the mirror server; means for judging, from the conditions of the main proxy server or the mirror server detected by the detecting means, whether data is to be transmitted to the user from the main proxy server or from the mirror proxy server; and means for transmitting data to the user.

For example, if the load of the main proxy server becomes heavy or the line conditions thereof become bad, data transmission to the user can be switched to the mirror server so that the congested traffic or a communications delay can be alleviated.

According to another aspect of the present invention, there is provided a server system having a main proxy server and a plurality of mirror servers, wherein the main proxy server comprises: means for acknowledging an access by a user; means for detecting the conditions of the main proxy server and the plurality of mirror server; and means for instructing one of the plurality of mirror servers to transmit data to the user, in accordance with the conditions of the plurality of mirror servers detected by the detecting means.

BRIEF DESCRIPTION OF THE DRAWINGS

FIG. 5 is a flow chart illustrating the process to be performed by a main proxy server.

DETAILED DESCRIPTION OF THE PREFERRED EMBODIMENTS

Figure 1:
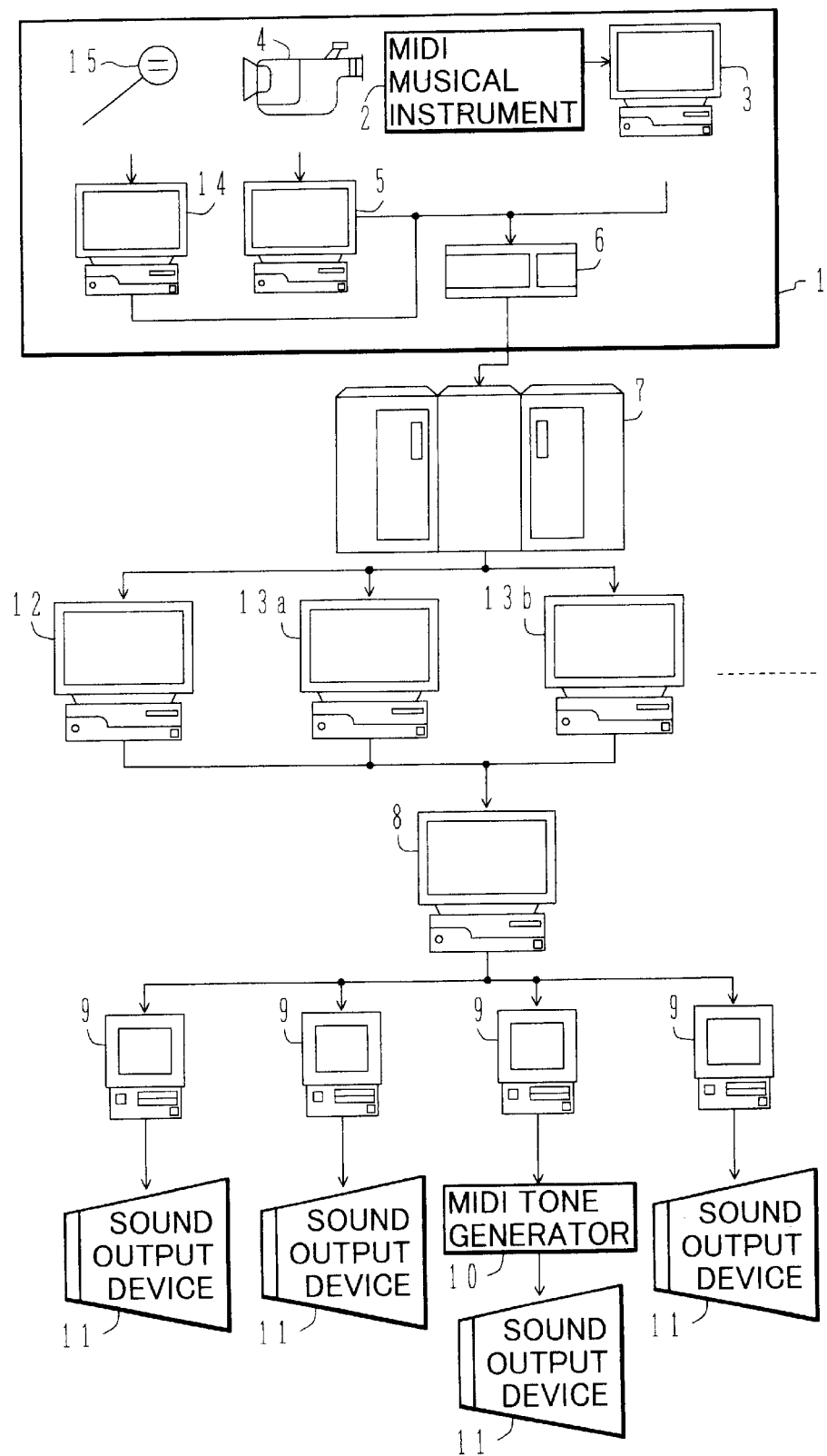
FIG. 1 is a schematic diagram showing a communications network for musical tone data and image data.

FIG. 1 shows a communications network for musical tone data and image data.

A concert hall 1 is installed with a MIDI musical instrument 2, a camera 4, a microphone 15, encoders 3, 5 and 14, and a rooter 6. A player plays the MIDI musical instrument 2 in the concert hall 1. The MIDI musical instrument 2 generates MIDI data in accordance with the performance by a player, and supplies it to the encoder 3. The encoder 3 transmits each packet of MIDI data of a predetermined format to the Internet via the rooter 6. The MIDI data includes key-on data and key-off data. For example, if a keyed musical instrument is used as the MIDI musical instrument 2, key-on data is generated when a player depressed a key and key-off data is generated when the key is detached.

The camera 4 takes an image of a player and supplies it as image data to the encoder 5. The encoder 5 transmits each packet of image data of a predetermined format to the Internet via the rooter 6. The microphone 15 samples sounds of live musical instruments such as singers and pianos and electronic musical instruments, and supplies these sample data to the encoder 14 as sound data. The encoder 14 transmits each packet of sound data of a predetermined format to the Internet via the rooter 6. The sound data includes, for example, digital data of sounds generated by live musical instruments.

The router 6 transmits MIDI data and image data to the Internet to be described hereinunder. The data is supplied from the router 6 to a main server 7 via a public telephone line or a leased telephone line, and to a plurality of proxy servers 12, 13a, 13b, . . . and further to a world wide web (WWW) server 8 which is a so-called provider.

The proxy server 12 is hereinafter called a main proxy server, and the proxy servers 13a, 13b. . . are hereinafter called a mirror server 13 singularly or collectively. The main proxy server 12 is a representative one of proxy servers. The mirror server 13 performs generally the same operations as the main proxy server 12.

However, the types of data which the main proxy server 12 and each mirror server can transmits are different. For example, some proxy servers can transmit both MIDI data and image data, whereas other proxy servers can transmit only MIDI data.

Each user can select a rank in accordance with the performance of a home computer of the user, the degree of services to receive, an available amount of money paid to data reception, and the like. For example, some ranks are permitted to receive data reception services of both MIDI data and image data, whereas other ranks are permitted to receive data reception services of only MIDI data.

Each user can receive services and a user ID by subscribing to the main proxy server 12 or a transmitter (service provider) by designating a rank. The main proxy server 12 stores user IDs and ranks in one-to-one correspondence.

Users A to D are given user IDs, passwords, and ranks such as shown in Table 1.

TABLE 1

| User Name | User ID | Password | Rank |
|---|---|---|---|
| User A | 147 | music | Rank A |
| User B | 258 | dog | Rank B |
| User C | 369 | xyz | Rank C |
| User D | 000 | guest | Rank Z |

A user ID is an identifier for discriminating between users. A password is constituted by characters or numbers used for inhibiting other users to use it. A user ID "000" and a password "guest" is made public to general users or guests.

For example, a rank A is permitted to receive data reception services of moving image data, MIDI data, and sound data. A rank B is permitted to receive data reception services of still image data, MIDI data, and sound data. A rank C is permitted to receive data reception services of only MIDI data and sound data. A rank Z is a rank for guests (trial guest rank) and permits any user to receive some services even if the user is still not a subscriber. For example, the rank Z is permitted to receive data reception service in a limited time or data reception service of only some parts of musical performance of MIDI data.

MIDI data or sound data having different sound qualities may be transmitted in accordance with each rank, or image data having different image qualities may be transmitted. For example, a portion of MIDI data, sound data or image data may be thinned, MIDI data may be limited only to a partial musical performance, or the number of image frames per unit time may be reduced when transmitting images.

Various seats may be assigned to users which access a concert hall where a musical performance is carried out. In accordance with the assigned seat of each user, MIDI data, sound data or image data to be transmitted may have different sound balances (sound images) and image contents (frame number).

The promoter of a concert may determine a prescribed number of the concert and sell tickets to users. Tickets may have ranks such as rank A (special seat), rank B (ordinary seat) and rank C (gallery).

A user can receive MIDI data, sound data or image data on the Internet by connecting its home computer 9 to the main proxy server 12 via the WWW server 8.

Specifically, a user first accesses the main proxy server 12 and enters the user ID and password. The main proxy server 12 checks the entered user ID and obtains the rank by referring to Table 1.

In accordance with the user rank, the main proxy server 12 assigns the user either the main proxy server 12 or one of the mirror servers 13 matching the rank. The user can receive desired data permitted by the rank from one of the proxy servers.

The main proxy server 12 also assigns the user either the main proxy server 12 or one of the mirror servers 13 matching the rank, in accordance with the load conditions or line conditions. The user can receive data from a proxy server having a light load or good line conditions.

The main proxy server 12 and mirror servers 13a, 13b, . . . have corresponding ranks, load conditions and line conditions shown in Table 2.

TABLE 2

|  | Corresponding Ranks | Load Conditions | Line Conditions |
|---|---|---|---|
| Main Proxity Server | All ranks | 60% | Good |
| Mirror Server 13a | All ranks | 40% | Rather congested |
| Mirror Server 13b | Rank C or lower | 80% | Good |

The corresponding ranks are some of the ranks A to Z shown in Table 1 to which each server can provide services. The main proxy server 12 and mirror server 13a can provide services to all ranks. Namely, the servers 12 and 13a can handle all of image data, MIDI data and sound data. The mirror server 13b can provide services to the rank C and lower ranks. Namely, the server 13b can handle only MIDI data and sound data.

Each of the proxy servers 12 and 13a can accept accesses from four users A to D at the same time, and can provide each user with different data. Namely, each proxy server does not supply the same data to all users, but data desired by each user is supplied by referring to the user ID.

The load conditions correspond to the number of users (lines) accessing the server. The proxy servers 12 and 13 judge that the load is large if the number of users accessing each server is large, and judge that the load is small if the number of users accessing each server is small. In determining the load conditions, the rank may be taken into consideration. Namely, the load may be weighted if the rank of a user accessing each server is high. For example, a total sum of degrees of ranks of each user accessing a server is calculated to determine the load conditions. The main proxy server 12 assigns the user either the main proxy server 12 or one of the mirror servers 13 having the smallest load.

The line conditions indicate whether the user access lines to the server 12 or 13 are congested or not. Even if the load of the proxy server 12 or 13 is light, the lines (including proxy sites) between the home computer 9 and proxy server 12 or 13 may be congested.

If the line conditions are good, smooth communications can be established without any communications delay. If the line conditions are congested, a delay is likely to occur in communications, and it is difficult to perform smooth communications. The main proxy server 12 can assign the user either the main proxy server 12 or one of the mirror servers 13 having the best line conditions.

For example, the line conditions can be tested by transmitting test data from the proxy server 12 or 13 to the home computer 9 and receiving the returned test data to measure a round time the test data took to propagate over the reciprocal paths. If the round time is longer than a reference value, the lines are congested, whereas if it is shorter than the reference value, the lines are good. If round times to and from several home computers are measured and its average value is used for judging the line conditions, the line conditions can be judged more reliably.

Since a user can receive data from the main proxy server 12 or mirror serve having a light load and good line conditions, a congested traffic of communications can be avoided and a communication delay is reduced.

The home computer 9 has a display device for the display of image data and an external or built-in MIDI tone generator (sound source) for the generation of musical tone signals. The MIDI tone generator generates musical tone signals in accordance with MIDI data, and supplies the tone signals to a sound output device 11. The home computer 9 converts received digital sound data into analog sound data and outputs it to the sound output device 11. The sound output device 11 reproduces sounds in accordance with the supplied MIDI data or sound data. Sounds same as those produced in the concert hall 1 can be reproduced from the sound output device 11 in real time.

If an external MIDI tone generator 10 is used, the home computer 9 makes the MIDI generator 10 generate musical tone signals and the sound output device 11 reproduces sounds.

Since the MIDI data and sound data are more important for a user than image data, the MIDI data and sound data are processed with a priority over the image data. Although a user does not feel uneasy about the image data with poor image quality and smaller frame number, sound information and musical tone information of MIDI data are required to have a high quality.

Any user can listen to a musical performance in real time by connecting the home computer 9 to the Internet while looking at each scene (video images) of the concert hall 1 on the display device at home without going to the concert hall 1. A number of users can enjoy at home the musical performance played in the remote concert hall.

MIDI data is transmitted from the concert hall 1 to each user so that each user can share a situation of the concert hall 1 as if the player is playing the electronic musical instrument at user home.

Instead of live musical tone information, if MIDI data is transmitted over the Internet, the sound quality is not degraded by noises.

Figure 2:
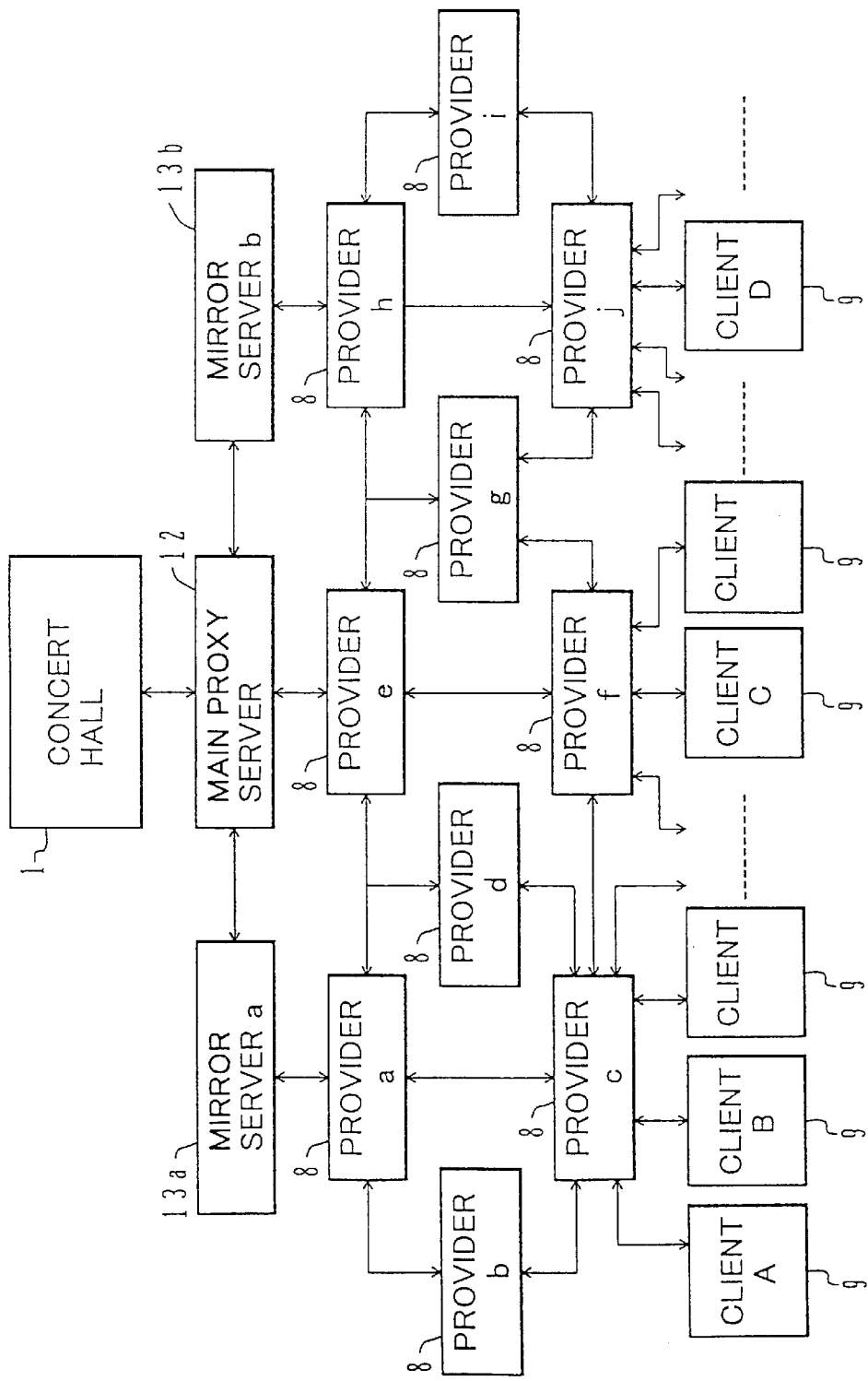
FIG. 2 is a schematic diagram showing a communication network extended from the network shown in FIG. 1.

FIG. 2 shows a communications network extended from the network shown in FIG. 1. In the network shown in FIG. 1, only a single WWW server 8 is used. In the network shown in FIG. 2, a plurality of WWW servers (hereinafter called providers) 8 are used. These providers are interconnected, and each provider is connected to a plurality of home computers (hereinafter called clients).

Each client 9 is connected via a plurality of providers 8 to the proxy server 12 or 13. The path between the client 9 and proxy server 12 or 13 is not a single path, but there are a plurality of paths. The line conditions are different at each path. Namely, even if the proxy server 13 has the heavy load conditions, its line conditions may be good, or conversely even if the proxy server 13 has the light load conditions, its line conditions may be bad.

In accordance with the load conditions and/or line conditions, the main proxy server 12 assigns the client 9 a proper proxy server 12 or 13. The client 9 can receive data from the proxy server 12 or 13 with less congested lines and small communications delay.

Figure 3:
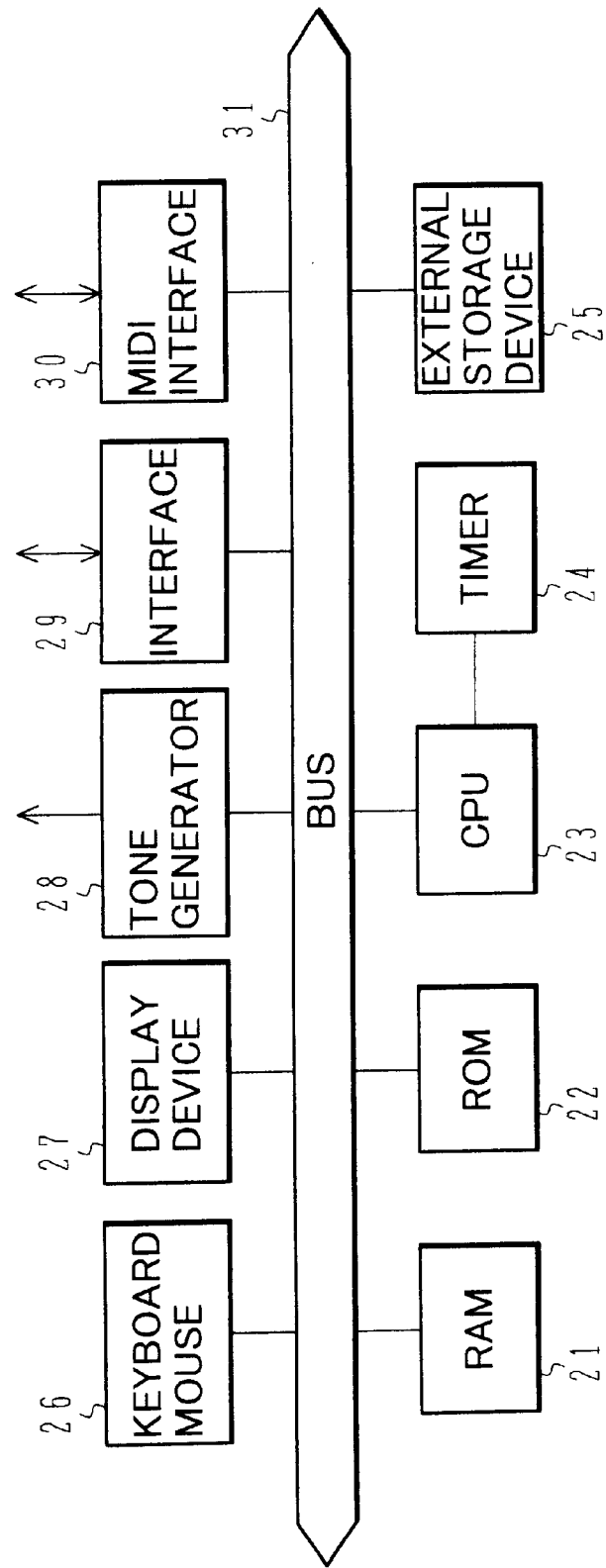
FIG. 3 is a block diagram showing the hardware structure of an encoder, a home computer, and a proxy server.

FIG. 3 shows the hardware structure of the encoders 3, 5 and 14 the client 9 which may be a general computer. Although the main proxy server 12 and mirror server 13 may have the hardware structure similar to that shown in FIG. 3, a MIDI tone generator 28 and a MIDI interface 30 are not necessarily required.

Connected to a bus 31 are an input device 26 such as a keyboard and a mouse, a display device 27, the MIDI tone generator 28, a communications interface 29 for connection to the Internet, the MIDI interface 30, a RAM 21, a ROM 22, a CPU 23, and an external storage device 25.

Various instructions can be entered from the input device 26. The display device 27 can display various setting information and images. The tone generator 28 generator musical tone signals in accordance with received MIDI data.

The communications interface 29 is used for transferring MIDI data, sound data and image data to and from the Internet. The MIDI interface 30 is used for transferring MIDI data to and from an external circuitry.

The external storage device 25 may be a hard disk drive, a floppy disk drive, a CD-ROM drive, a magneto-optical disk drive or the like and may store therein MIDI data, sound data, image data, computer programs and the like.

ROM 22 may store therein computer programs, various parameters and the like.

RAM 21 has working areas such as buffers and registers to copy and store data in ROM 22 and the external storage device 25. In accordance with computer programs stored in ROM 22 or RAM 21, CPU 23 performs various calculations and signal processing. CPU 23 can fetch timing information from a timer 24.

Figure 4A:
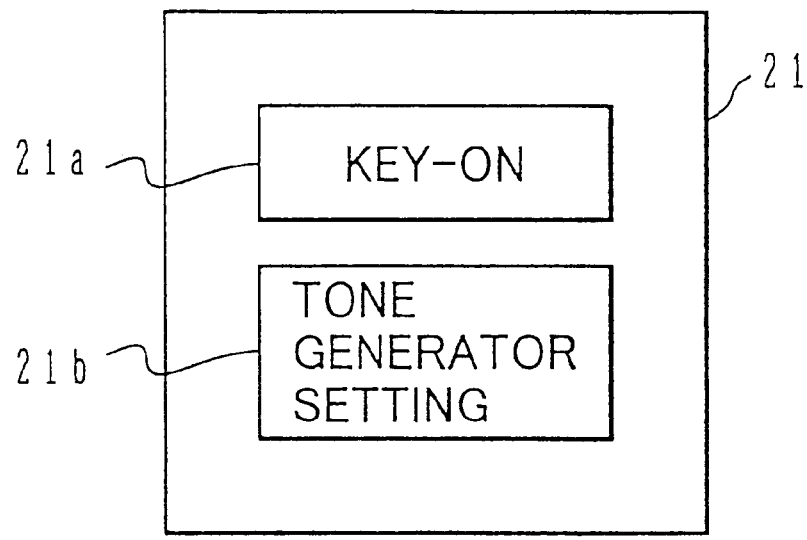
FIG. 4A shows the structure of a RAM used by an encoder and a client.

RAM 21 has the different structures among the encoders 3, 5 and 14, clients 9, proxy servers 12 and 13. FIG. 4A shows the structure of RAM used by the encoders 3, 5 and 14 and clients 9. This RAM 21 has a key-on buffer 21a and a tone generator setting buffer 21b. The key-on buffer 21a stores therein a key-on event contained in MIDI data, and the tone generator setting buffer 21b stores therein tone generator setting information contained in MIDI data.

Figure 4B:
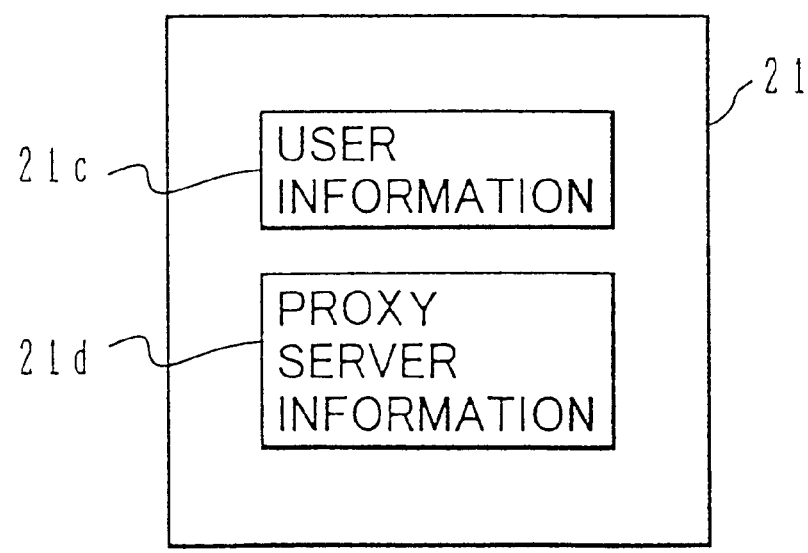
FIG. 4B shows the structure of a RAM used by a proxy server.

FIG. 4B shows the structure of RAM used by the proxy servers 12 and 13. This RAM 21 has a user information storage field 21c and a proxy server information storage field 21d. The user information storage field 21c stores user information shown in Table 1, and the proxy information storage field 21d stores proxy server information shown in Table 2.

Next, the hardware of the client 9 will be described with reference to FIG. 3. A user enters an address of the main proxy server 12 from the input device 26, and thereafter enters the user ID and password so that the main proxy server 12 can be accessed. The display device 27 displays a scene (image) of a concert hall by using the received image data, and the MIDI tone generator 28 generates and outputs musical tones by using the received MIDI data.

The external storage device 25 may be a hard disk drive (HDD). HDD 25 may store therein various data such as computer program data and MIDI data. If a necessary computer program is stored not in ROM 22 but in a hard disk loaded in HDD 25, this program is read into RAM 21 so that CPU 23 can run this computer program in the similar manner as if the program is stored in ROM 22. In this case, addition, version-up and the like of a computer program become easy. The external storage device 25 may be a CD-ROM (compact-disk—read-only-memory) drive which can read various data such as computer programs stored in a CD-ROM. The read data such as a computer program is stored in a hard disk loaded in HDD. Installation, version-up and the like of an application program become easy.

The communications interface 29 is connected to a communications network such as the Internet, a local area network (LAN) and a telephone line, and via the communications network to a server computer (e.g., server 7 shown in FIG. 1). If computer programs and data are not stored in a hard disk loaded in HDD 25, these programs and data can be downloaded from the server computer. In this case, the encoder 3, 5, 14 or home computer 9 as a client transmits a command for downloading a computer program or data to the server computer via the communications interface 29 and communications network. Upon reception of this command, the server computer supplies the requested computer program or data to encoder or home computer as a client via the communications network which client receives it via the communications interface 29 and stores it in a hard disk loaded in HDD 25.

This embodiment may be reduced into practice by a commercially available personal computer installed with computer programs and various data realizing the functions of the embodiment. The computer programs and various data may be supplied to a user in the form of a storage medium such as a CD-ROM and a floppy disk which the personal computer can read. If the personal computer is connected to the communications network such as the Internet, a LAN and a telephone line, the computer programs and various data may be supplied to the personal computer via the communications network.

FIG. 5 is a flow chart illustrating the process to be executed by the main proxy server 12.

At Step SA1 it is checked whether a new client 9 accessed. The client 9 is a computer used by the user. If the user enters an address (URL: uniform resource locator) of the main proxy server 12 into the client 9, the client 9 can be connected to the main proxy server 12. If there is no access, the main proxy server 12 stands by until a new client accesses. If the new access is made, the flow advances to Step SA2.

At Step SA2, the client is instructed to enter the user ID and password. The client urges the user to enter them. The user enters the user ID and password (Table 1).

At Step SA3 it is checked whether the user ID and password have been entered. The user ID and password are registered in advance in the main proxy server 12. If the user ID and password are correct, it is judged that the user ID and password have been properly entered. If there is no input, the flow returns to Step SA2 to urge the client to enter the user ID and password. After the input, the flow advances to Step SA4.

At Step SA4, the user ID and password entered by the user are acknowledged, and in accordance with the user ID or with the user ID and password, the user rank is judged. This judgement is made by referring to the data of Table 1 stored in RAM.

At Step SA5 the load conditions of each proxy server 12, 13 are detected to judge whether data can be transmitted. Both the load conditions and line conditions may be detected to judge whether data can be transmitted. The detected load and line conditions are stored in RAM in the format shown in Table 2. It is therefore possible to judge whether data can be transmitted from the proxy server 12 or 13 having a light load and good line conditions.

At Step SA6 it is decided which proxy server 12, 13 is assigned to the new client, in accordance with the judged user rank and judged proxy servers for data transmission. With this decision, a proper proxy server is determined by using the data of Table 2 stored in RAM and in accordance with the user rank and load and line conditions. Further, proxy servers 12 and 13 capable of transmitting data requested by a user with each rank are first selected, and from these servers, a proper proxy server 12, 13 with good load and line conditions is selected.

At Step SA7, the client is connected to the selected proxy server which is then instructed to transmit the data to the client. Therefore, the client can smoothly receive the data matching the rank from the proxy server. Thereafter, the flow returns to Step SA1 whereat the main proxy server 12 stands by to receive a new client access.

This flow chart illustrates the process of assigning a newly accessed client a proper proxy server. Next, another process will be described in which a client under connection is assigned another server because of degraded line conditions or a request from the client.

Figure 6:
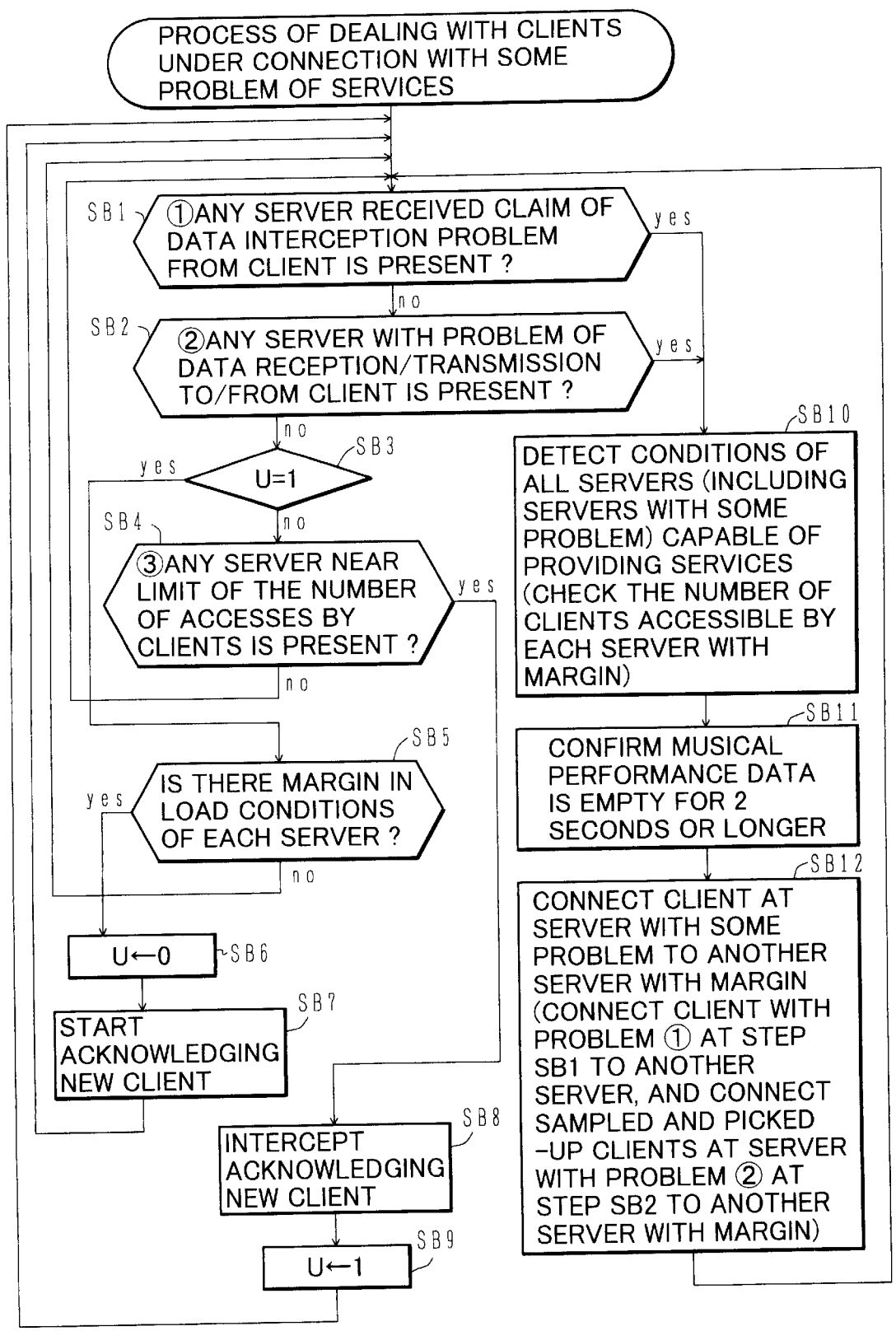
FIG. 6 is a flow chart illustrating the other process to be performed by the main proxy server.

FIG. 6 is a flow chart illustrating this other process to be executed by the main proxy server 12. This flow chart illustrates the process which is executed for the client under connection.

At Step SB1 it is checked whether there is any proxy server which received from the client a claim that there is a trouble of data interception. If the reception conditions at the client are poor, the user depresses a specific switch on the client to notify the server of such a claim. If there is a server received such a claim, the flow advances to Step SB10, whereas if there is no such server, the flow advances to Step SB2.

At Step SB2 it is checked whether there is any proxy server having a trouble of data communications conditions. More particularly, it is checked whether there is any proxy server having a problem of line conditions, by detecting the line conditions of each proxy server. If there is a server with such a problem, the flow advances to Step SB10, whereas if there is no such server, the flow advances to Step SB3.

At Step SB10, the conditions of all proxy servers (including proxy servers with some problem) capable of providing services matching the user rank of the client under connection are checked. The number of clients newly connectable to each proxy server having a margin in the load and line conditions, i.e., the number of clients capable of being assigned a new proxy server, is checked.

At Step SB11, it is confirmed whether MIDI data (musical performance data) has not been transmitted longer than a predetermined time, e.g., two seconds or longer. If the proxy server is switched during musical performance, the musical performance is temporarily suspended. It is therefore necessary to switch the proxy server while MIDI data is not transmitted. The main proxy server 12 stands by until the MIDI data is suspended longer than the predetermined time, and if this suspended state enters, the proxy server is switched at Step SB12.

At Step SB12, the client is switched from the proxy server with some problem to a new proxy server with a margin. If the claim is received from the client at Step SB1, this client is connected to a new proxy server. If the proxy server with some problem is detected at Step SB2, sampled and picked-up clients (preferably clients whose line conditions were actually checked by measuring the round time) corresponding in number to the number of accessible clients checked at Step SB10 are connected to a new proxy server. Thereafter, the flow returns to Step SB1 to repeat the above processes.

At Step SB3 it is checked whether a load condition flag U is "1". This flag "0" indicates that there is at least one proxy server having a light load, and the flag "1" indicates that there is no proxy server with a light load. At the initial state, the flag U is "0" because the number of accessed clients is 0 and the load is light.

If the flag U is "0", the flow advances to Step SB4 whereat the load conditions of each proxy server are checked to thereby judge whether the number of clients accessed to the proxy server at each user rank reaches a limit or near the limit.

If the number of clients accessed does not reach the limit, a new client can be accepted so that the flow returns to Step SB1 to repeat the above processes. If the number of clients accessed reaches the limit, the flow advances to Step SB8 to suspend the reception of a new client. Thereafter, the flag U is set to "1" at Step SB9 to return to Step SB1. The flag U may be provided for each rank to suspend the reception of a new client having the corresponding rank.

If it is judged at Step SB3 that the flag U is "1", the flow advances to Step SB5 whereat the load conditions of each proxy server are detected to check whether there is any margin in the load conditions of each proxy server.

If there is no margin in the load conditions, the flag U is maintained to be "1", and the flow returns to Step SB1. If there is a margin, the flow advances to Step SB6 whereat the flag U is set to "0". Thereafter, at Step SB7, reception of a new client resumes to return to Step SB1. If the flag U is provided for each user rank, reception of a new client can be resumed at the user having the corresponding rank.

In the embodiment described above, musical performance information (MIDI data or sound data) and musical performance image (image data) in a concert hall can be supplied to a number of users by using the Internet. A user can obtain MIDI data, sound data and image data in real time at home without going to the remote concert hall.

Specific keys may be provided on the client to transmit responses from the user to a concert hall, such as "encores" and "booing" by depressing the keys. Such responses can be transmitted as MIDI data back to users from the concert hall. Since users can hear such responses from other users in addition to musical tones of a performance, the users can enjoy the atmosphere in the convert hall.

Each user can select the rank in accordance with the performance of a client of the user, the degree of services to receive, an available amount of money paid to data reception, and the like. The rank is assigned to each user ID. The proxy server checks the rank from the user ID so that data matching the user rank can be supplied.

Each proxy server can detect its own load and line conditions. The main proxy server assigns each client a proxy server in accordance with the load and line conditions of each proxy server. A user can receive data from a proxy server having a light load and good line conditions so that a congested traffic of communications can be avoided and a communications delay can be reduced.

The main proxy server may detect a problem such as a failure of each proxy server in addition to the load and line conditions to change the connection of clients in accordance with the detected results. Even if some proxy server has a problem, this problem can be remedied by another proxy server.

When accessed by a client, the main proxy server 12 may assign the client any one of a plurality of mirror servers 13. In this case, one of the mirror servers 13 transmits data to the client and the main proxy server 12 is not necessary to transmit data.

In the network shown in FIG. 1, the main server 7 is not always necessary. If the main server 7 is not used, the proxy server 12 or 13 becomes a server and which is not necessarily required to have a proxy function. In this case, the proxy servers 12 and 13 are not different from a general main server.

The embodiment is not limited only to the Internet, but other communication systems may also be used, for example, digital serial communications of IEEE 1394 specifications, communication satellites and the like.

The present invention has been described in connection with the preferred embodiments. The invention is not limited only to the above embodiments. It is apparent that various modifications, improvements, combinations, and the like can be made by those skilled in the art.

What is claimed is:

1. A proxy server connected to a network including a client apparatus and a plurality of servers, each of which can provide a plurality of kinds of data generated by one information source, said proxy server comprising:

a first storing device that stores a user ID for identifying a user and a corresponding rank of service specifying a type of data content and a quality of data that the user desires to receive;

a second storing device that stores information relating to the rank of a service with which each of the plurality of servers can handle;

a receiving device that receives the user ID from the client apparatus, wherein the rank of service corresponding to the user ID is specified by referring to said first storing device;

a determining device that determines a server to be connected with the client apparatus from the plurality of servers in accordance with the rank of a service corresponding to the user ID and the rank of a service with which each of the plurality of servers can handle; and a connecting device that connects the determined server with the client apparatus.

2. A proxy server according to claim 1, further comprising a detecting device that detects a condition of each of the plurality of servers, wherein the determining device determines a server to be connected with the client apparatus in accordance with the detected condition of each of the plurality of servers, the rank of a service corresponding to the user ID, and the information relating to the rank of a service with which each of the plurality of servers can handle.

3. A proxy server according to claim 2, further comprising:

a receipting device that receipts a problem report from the client apparatus;

a re-detecting device that redetects the condition of each of the plurality of servers when the receipting device receipts the problem report;

a re-determining device that re-determines a server to be connected with the client apparatus in accordance with the re-detected condition of each of the plurality of servers, the rank of a service corresponding to the user ID, and the information relating to the rank of a service with which each of the plurality of servers can handle; and a re-connecting device that re-connects the redetermined server with the client apparatus.

4. A proxy server according to claim 2, further comprising:

a checking device that checks whether, for any one of said plurality of servers, any communication problems exists;

a re-detecting device that, in response to the checking device detecting a server having communication problems, redetects a condition of a server that can handle with the service of the rank corresponding to the user ID;

a re-determining device that re-determines a server to be connected with the client apparatus in accordance with the re-detected condition; and a re-connecting device that re-connects the re-determined server with the client apparatus.

5. A proxy method for a network including a client apparatus and a plurality of servers, each of which can provide a plurality of kinds of data generated by one information source, said proxy method comprising the steps of:

storing a user ID for identifying a user and a corresponding rank of service specifying a type of data content and a quality of data that the user desires to receive;

storing information relating to the rank of a service with which each of the plurality of servers can handle;

receiving the user ID from the client apparatus, wherein the rank of service corresponding to the user ID is specified by referring to said first storing device;

determining a server to be connected with the client apparatus from the plurality of servers in accordance with the rank of a service corresponding to the user ID and the rank of a service with which each of the plurality of servers can handle; and connecting the determined server with the client apparatus.

6. In an environment of network including a client apparatus and a plurality of servers, each of which can provide a plurality of kinds data generated by one information source, a machine-readable medium containing a set of executable instructions for causing a processor to perform the steps of:

storing a user ID for identifying a user and a corresponding rank of service specifying a type of data content and a quality of data that the user desires to receive;

storing information relating to the rank of a service with which each of the plurality of servers can handle;

receiving the user ID from the client apparatus, wherein the rank of service corresponding to the user ID is specified by referring to said first storing device;

determining a server to be connected with the client apparatus from the plurality of servers in accordance with the rank of a service corresponding to the user ID and the rank of a service with which each of the plurality of servers can handle; and connecting the determined server with the client apparatus.

* * * * *